US007861231B2

(12) United States Patent
Rangarajan et al.

(10) Patent No.: US 7,861,231 B2
(45) Date of Patent: Dec. 28, 2010

(54) SYSTEM AND METHOD OF IDENTIFICATION OF DANGLING POINTERS

(75) Inventors: Kumar Rangarajan, Bangalore (IN); Satish Chandra Gupta, Ottapalam (IN); Ziv Glazberg, Haifa (IL); Ishai Rabinovitz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 11/684,320

(22) Filed: Mar. 9, 2007

(65) Prior Publication Data

US 2008/0222224 A1  Sep. 11, 2008

(51) Int. Cl.
*G06F 9/44* (2006.01)

(52) U.S. Cl. .................. 717/130; 717/126; 717/127

(58) Field of Classification Search .................. None
See application file for complete search history.

(56) References Cited

U.S. PATENT DOCUMENTS

| 5,193,180 A | 3/1993 | Hastings |
| 5,335,344 A | 8/1994 | Hastings |
| 5,535,329 A | 7/1996 | Hastings |
| 5,581,696 A | 12/1996 | Kolawa et al. |
| 5,644,709 A | 7/1997 | Austin |
| 5,842,019 A * | 11/1998 | Kolawa et al. ............... 717/130 |
| 6,658,653 B1 * | 12/2003 | Bates et al. .................. 717/131 |
| 6,823,507 B1 * | 11/2004 | Srinivasan et al. ........... 717/152 |
| 7,343,598 B2 * | 3/2008 | Chilimbi et al. ............. 717/158 |
| 2007/0150879 A1 * | 6/2007 | Rangarajan et al. .......... 717/154 |

OTHER PUBLICATIONS

Zakarya Alzamil, 2006, "Application of Computational Redundancy in Dangling Pointers Detection", IEEE.*
Richard Eyre-Todd,1993,"The Detection of Dangling References in C++ Programs", ACM, vol. 2 pp. 127-134.*

* cited by examiner

*Primary Examiner*—Wei Y Zhen
*Assistant Examiner*—Junchun Wu
(74) *Attorney, Agent, or Firm*—Hamilton, Brook, Smith & Reynolds, P.C

(57) ABSTRACT

A method and system to identifying the use of dangling pointers in software instrumentation irrespective of the location of the pointer in the memory. The main memory is preferably segmented into three parts defined as a first memory, a version segment and a pointer version segment. By use of the version segment and pointer version stored in the pointer version segment, checksum are made on a pointer version with a version on dereferencing a pointer in the first memory to identify references to a dangling pointer on negative determination. Identified dangling pointer may be reported to the end user.

13 Claims, 2 Drawing Sheets

SYSTEM AND METHOD OF IDENTIFICATION OF DANGLING POINTERS

FIELD OF THE INVENTION

This invention relates to identifying the use of dangling pointers in a program (software) irrespective of the location of the pointer in the memory.

BACKGROUND OF THE INVENTION

Dangling pointers (also referred to as wild pointers) in computer programming are pointers that point to memory that has already been freed. Dangling pointer typically arise when an object is deleted or deallocated, without modifying a value associated with a pointer referencing the object, such that the pointer after the object being deleted or deallocated is still pointing to a memory location of the deallocated memory. A system may reallocate the previously freed memory location to another object or even to another process. If the original program (software) dereferences the dangling pointer, unpredictable behavior may result, as the memory location may now contain completely different data. A disadvantage is that if the program writes data to memory pointed by a dangling pointer, as silent corruption of unrelated data may result, leading to subtle bugs that can be extremely difficult to find, or cause segmentation faults or general protection faults (Windows), and in particular if the overwritten data is bookkeeping data used by the system's memory allocator, this corruption can cause system instabilities. Hence detecting dangling pointers becomes a critical part of runtime memory analysis.

In many programming languages, and in particular the C/C++ programming language deleting an object from a memory location does not alter any associated pointers. The pointer still points to the memory location where the object or data was, even though the object or data has since been deleted and the memory may now be used for other purposes, thereby creating a dangling pointer. Other methods of creating dangling pointer for example include, the use of uninitialized pointers or pointers to a stack frame that have been popped off the runtime stack and hence no longer valid, or inappropriate pointer casts, or inappropriate pointer arithmetic etc.

A further frequent source of creating dangling pointers is a jumbled combination of a malloc( ) and a free( ) library call. Typically, in such cases, a pointer becomes dangling when the block of memory or the memory location that the pointer points to is freed. One way to avoid this is to ensure that the pointer back is set back to null after freeing the memory location.

Further, a common programming misstep that creates a dangling pointer is returning an address of a local variable. Since local variables are deallocated when a function returns, any pointers that point to local variables of that function will become dangling pointers once the stack frame is deallocated. This may occur in a non-trivial way also, such as an address of a local variable is passed as an argument to a method, which is perfectly valid. But later, reference made to a called method or another method directly or indirectly, stores this address in heap, if this heap location containing the address the local variable is used after the stack frame containing the local variable has been de-allocated.

A tool like IBM™ Rational Purify™ is configured to identify dangling pointers to memory locations/regions in a heap by using a deferred-free approach and intercepting methods calls such as malloc and free in the program. Intercepted free calls typically do not free the memory regions immediately; instead such calls adds the memory region to an available free queue and marks the memory region that was freed as invalid. Maintaining a free queue ensures that any future malloc calls (at least the immediate future ones) will not overlap with the recently freed memory regions. Since the freed memory regions have been marked as invalid, references to those memory regions will be detected as 'Free Region Reads' and are hence dangling pointers referring to the heap memory. In addition tools such as Valgrind, Mudflap, Addrcheck, Helgrind, LLVM etc., can also be used to detect uses of dangling pointers, each having its own advantages and disadvantages.

A disadvantage is that dangling pointer bugs are frequently security holes similar to buffer overflow bugs. For example, if the pointer is used to make a virtual function call, a different address (possibly pointing at exploit code) may be called due to the vtable pointer being overwritten. Alternatively, if the pointer is used for writing to memory locations, some other data structure may be corrupted in the process. Even if the memory is only read once the pointer becomes dangling, and can lead to information leaks (when data is placed in the next structure allocted) or a privilege escalation (if the now-invalid memory is used in security checks).

Without a way to improve the method and system of performance problem localization, the promise of this technology may never be fully achieved.

SUMMARY OF THE INVENTION

Accordingly, the present invention provides a method and a system to identifying the use of dangling pointers in a program (software) irrespective of the location of the pointer in the memory. The main memory is preferably segmented into three group defined as a first memory (first segment), which form part of the original main memory and configured to perform the function of the main memory, for example configured to store an object, the object is a respective stack and/or a respective heap. The main memory has a second segment defined as a version segment which is configured to store a version of a memory location in the first memory; values associated with the version are initialized to zero. The main memory has a third segment defined as a pointer version segment which is configured to store a version of the pointer associated with the memory location in the first memory, values associated with the pointer version initialized to a negative value. All values associated with the version and the pointer versions are numeric values.

Reference to a dangling pointer is indicated on negative determination of a checking the pointer version with the version on dereferencing a pointer in the first memory. The invention advantageously involves first instrumenting a software (program) and inserting additional code (instruction) at pre defined memory locations that update versions of objects and pointer versions of pointers and does needed checking to identify dangling pointers. A further advantage of the invention is that padding of memory is no longer required thereby avoiding any interference with the associated pointer arithmetic. Other associated embodiments are also disclosed.

DETAILED DESCRIPTION

Figure 1:
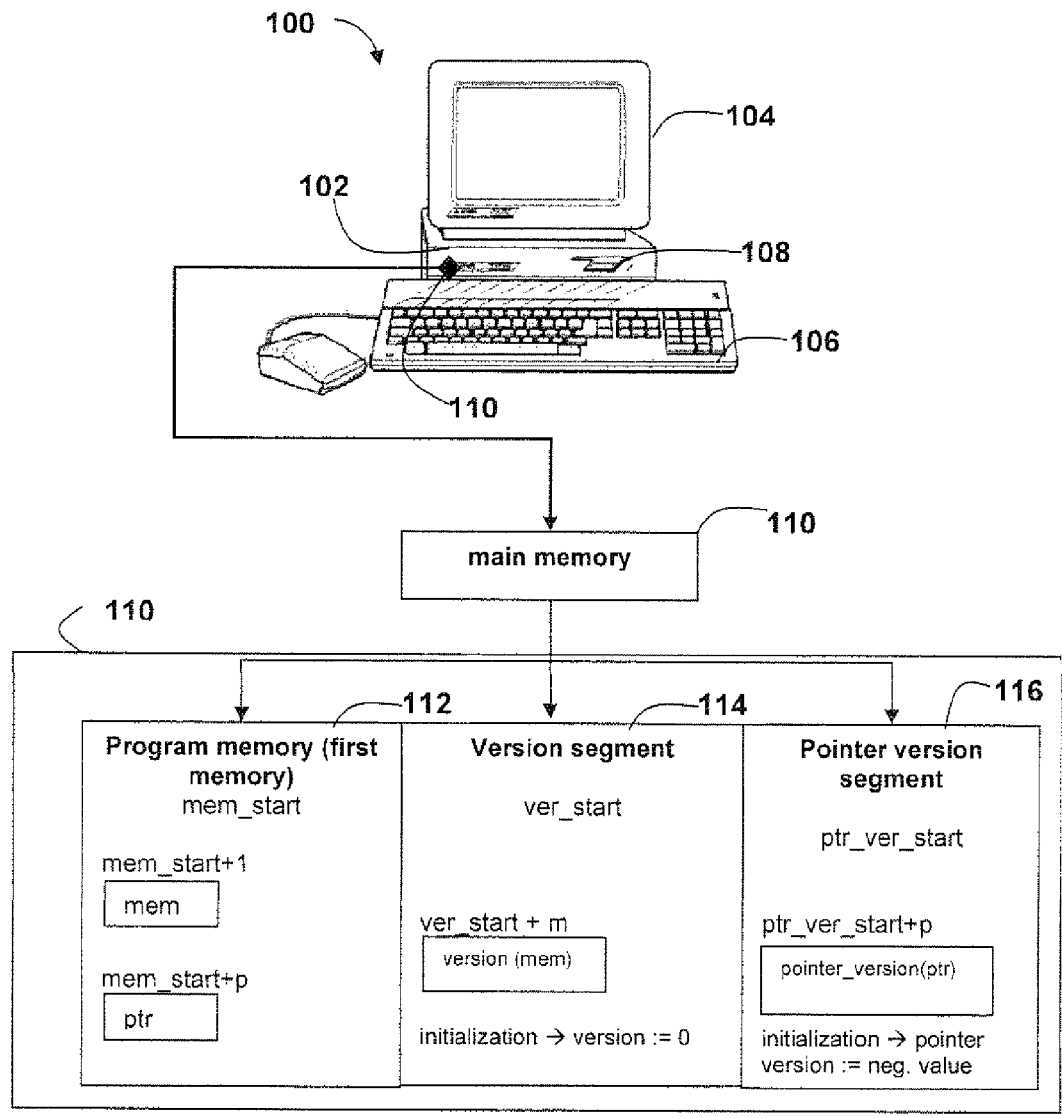
FIG. 1 illustrates an exemplary embodiment of a system 100 with a memory 110, and segmenting of the main memory 110 in accordance with the present invention to identify and report dangling pointers.

Where reference is made in any one or more of the accompanying drawings to steps and/or features, which have the same reference numerals, those steps and/or features have for the purposes of this description the same function(s) or operation(s), unless the contrary intention appears. The term "software", "program", "code" and "instruction" are used synonymously. Other equivalent expressions to the above expression would be apparent to a person skilled in the art.

The system 100, preferably a processing system or a computing system, include and are not limited a variety of electronic devices such as desktop computers, application servers, web servers, database servers and the like and portable electronic devices such as mobile phones, personal digital assistants (PDAs), pocket personal computers, laptop computers, and the like. It should be apparent to a person skilled in the art that any device which includes at least a processor and a memory configured to perform instrumentation falls within the scope of the present invention.

FIG. 1 illustrates an exemplary embodiment of a system 100 (computing system or device and/or a processing device) with a memory 110 and segmenting of the main memory 110 associated with such a computing system 100 in accordance with the present invention to identify and report dangling pointers. The computing system 100 in which the present invention may be implemented is depicted in accordance with a one embodiment. A computing system 100 is depicted which includes a system unit 102, the system unit 102 further includes essential hardware components such as a microprocessors, memory 110, connectors, system bus, power unit etc (some of which are not shown in the Figure), a video display terminal 104, an input device 106, the input device including a keyboard, mouse, a joystick, touchpad, touch screen, trackball, microphone, etc., and storage devices 108, which may include floppy drives and other types of permanent and removable storage media. Although the depicted representation shows a stand alone computing system 100, further embodiments of the present invention may be implemented in other types of computing systems 100, coupled over a network. For example a wired network, wireless network work or a combination thereof. The computing system 100 also preferably includes a graphical user interface (GUI) that may be implemented by means of systems software residing in computer readable media in operation within the computing system 100.

The memory 110 associated with any computing system 100 typically an electronic holding place for instructions and/or data accessed, such as a semiconductor device e.g. random access memory (RAM), such that microprocessor of the computing system 100 can access the instruction and/or data rather quickly. When the computing system is in normal operation, the memory 110 usually contains the main parts of the operating system and some or all of the application programs and related data that are being used by the computing system. Accessing data via the memory 100 is faster than reading from a hard drive, so having a larger RAM makes it quick to retrieve recently accessed files, applications, and other data. Further, all programs must be run through the memory 110 before they can be used.

In one embodiment, software can be advantageously executed and/or processed or instrumented on the memory 110 of the computing system 100. To advantageously detect and report references to dangling pointers in the memory 110, the memory is segmented (portioned) into three parts. The main memory 110 is portioned into a program memory (first memory), a version segment and a pointer version segment. It should be apparent to a person skilled in the art that the main memory 110 forms an important component of such computing systems 100 and can be portioned into more that three parts, and such segmentation of the memory 10 falls within the scope of this invention.

The invention is advantageously implemented by first instrumenting a software (program) and inserting additional code and/or instructions at predefined locations, which are configured to update versions of the objects in the first memory and pointer versions of pointers in the first memory which are pointing to object in the first memory thereby avoiding the need for checking to identify the existence of any dangling pointers.

The main memory 110 is segmented into three parts as follows:
i) a first memory or program memory 112 which is used for program use such as stack and heap,
ii) a version segment 114 which is part of the main memory 10 used for storing versions of objects in first memory 112, the values of the version stored in the version segment are initialized to zero, and
iii) a pointer version segment 116 which is also part of the main memory 110 and used for storing pointer versions of pointers pointing to objects in the first memory 112, the values associated with the pointer version stored in the pointer version segment are initialized to a negative value, preferably −1.

Noticeably, the first memory 112 is part of the original main memory 110 and has the same properties as those associated with the main memory 110 such as processing objects. The functioning of the stack and heap associated with the first memory 112 are well know to a person skilled in the art and fall within the scope of this invention.

As indicated in FIG. 1, "mem_start" is the start address of first memory segment, "ver_start" is the start address of version memory segment, and "ptr_ver_start" is the start address of "ptr" version segment. For an object "mem" at memory address "mem_start+m" in the first memory the version associated with the object in the first memory "version(mem)" is stored at address "ver_start+m" in version segment. The offset from start of the segment is the same (which is "m"). Similarly, for a pointer "ptr" at address "mem_start+p" in the first memory segment, the pointer version "pointer_version (ptr)" is stored at address "ptr_ver_start+p" in the pointer version segment. Again, the offset from start of respective segment is same (which is p). If "ptr=&mem;" is executed, and it is assumed that the version of "mem" is "n", then "n" will be stored at both addresses: "ver_start+m" and "ptr_ver_start+p".

The offset of the version storage location for an object from the start of the version segment is same as the offset of a memory location from the start of the first memory 112. The offset of the pointer version storage location for a pointer pointing to an object in the first memory 112 from the start of pointer version segment is same as the offset of pointer location from the start of first memory 112. This advantageously enables computations of version and pointer version locations simple and computationally inexpensive. There are six types of interesting features addressed by this invention: program initialization, memory allocation, pointer creation, pointer copy, pointer use (de-reference, pointer arithmetic) and memory de-allocation.

Program initialization implies that additional code/instruction is inserted to initialize the version counter to zero, the version counter being associated with the main memory 110, initialize the version segment to zero, the version segment 112 being part of the main memory 110, and initializing the pointer version segment to a negative number, preferably −1, and the pointer version segment also being part of the main memory 110.

Memory allocation may occur due to a stack frame creation at a time and/or instance of a method/function call in the software, or when heap memory allocation methods/functions such as malloc( ) are called. Additional code/instruction is inserted into the software to increment the version counter. The incremented value of the version counter indicates the version of the newly allocated memory. This value is stored in a respective memory location in the version segment.

Pointer creation occurs when an address of the object is stored in a pointer, for example ptr=&mem; where "ptr" refers to a pointer and "&mem" refers to the address of the pointer. Additional code/instruction is then inserted to copy the version of the memory location into pointer version of the pointer such as pointer_version(ptr)=version(mem), where "pointer_version" refers to pointer version, "mem" refers to the memory location and "version" refers to version.

Pointer copy occurs when a pointer is copied into another pointer ptr2=ptr1. Additional code/instruction is inserted to copy the pointer version of ptr1 to pointer version of ptr2 such as pointer_version(ptr2)=pointer_version(ptr1).

Pointer use occurs when either a pointer is de-referenced from the memory location or pointer arithmetic is completed. Addition code/instruction is inserted to check whether the pointer version of the pointer which is pointing to the object is same to the version of the memory that the pointer is pointing to. For example, in case of de-referencing a pointer "*ptr", the test would be to check whether pointer_version (ptr)=version(*ptr). In case of pointer arithmetic, "ptr++" or any arithmetic expression on the pointer "ptr" (for example ptr+xyz) the test would be check whether pointer_version (ptr)==version(ptr+xyz). In the case of pointer arithmetic, the pointer version of the base pointer "ptr" is compared against the version of the result of pointer arithmetic computations. If the equality or checksum test as indicated above fails, i.e. on negative determination, the pointer "ptr" is identified to be a dangling pointer. Such a dangling pointer can be easily identified and reported.

Memory de-allocation occurs when a method/function execution is completed and the stack frame for the method/function is freed, or when methods/functions like free( ) are called for de-allocating heap memory. Additional code is added to set the version of freed memory to a negative number, preferably −1.

Figure 2:
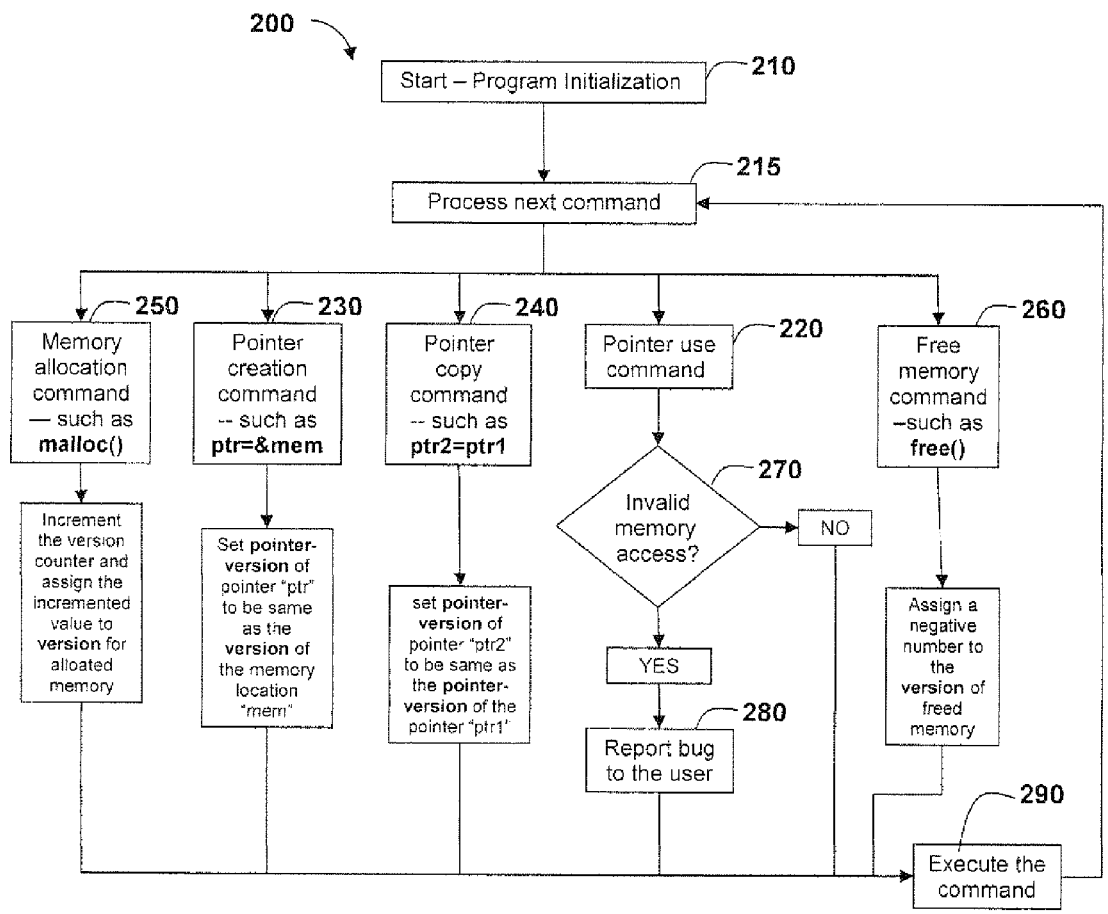
FIG. 2 illustrates an exemplary embodiment of a method 200 of identifying and reporting dangling pointers.

FIG. 2 illustrates an exemplary embodiment of a method 200 of identifying and reporting dangling pointers. As discussed previously, for the computing system 100, the method in 210 consists of segmenting the main memory into at least three part for instrumenting a software (program) and inserting additional code and/or instructions at predefined locations, which are configured to update versions of the objects in the first memory and pointer versions of pointers in the first memory which are pointing to object in the first memory thereby avoiding the need for checking to identity the existence of any dangling pointers.

The main memory is segmented into three parts:
i) a first memory,
ii) a version segment, and
iii) a pointer version segment.

which have been discussed previously. This segmentation/partitioning of the main memory is advantageously used to identify dangling pointer and report such dangling pointer to a user of the computing system 100. The first memory 112 is part of the original main memory 110 and has the same properties as those associated with the main memory 110 such as processing objects. Once the main memory has been segmented in 210, during program initialization additional code/instruction is inserted initializing a version counter to zero, the version counter being associated with the main memory, initializing the version segment to zero, and initializing the pointer version segment to a negative number, preferably −1.

Once the values have been initialized, in 215 the method is configured to process the next command which may be any one of the five of the six types of interesting features addressed by this invention. One of the features of program initialization has already been completed. The remaining five features are memory allocation, pointer creation, pointer copy, pointer use (de-reference, pointer arithmetic) and memory de-allocation, which have also been described previously.

In 220, pointer use is defined, wherein a pointer is either de-referenced or pointer arithmetic computation is performed. A validity check is made in 270 to check if the memory access is valid or not. If the check for an invalid memory access in 270 is negative, the control is transferred to 290 wherein the command is executed and after execution of the command in 290, the control is transferred back to 215, whenever the command is executed in 290 the control is transferred back to 215 to process the next command. If the check for an Invalid memory access in 270 is true, a bug is detected/identified and reported to the user in 280, and control is transferred to 290. Typically the validity check for pointer de-referencing is to check is the "pointer_version(ptr)==version(mem), if this is not true then an invalid memory location is being accessed and if this is true a valid memory location is being accessed. For pointer arithmetic, the pointer version of the base pointer "ptr" is compared against the version of the result of pointer arithmetic computations. If the pointer version of the base pointer is not similar to the pointed version of the pointer memory location after a calculation is performed, then an invalid memory location is accessed else valid memory location is accessed.

In 230 a pointer is created and this has been described previously, and occurs when address of an object is stored in a pointer, and additional code/instruction is inserted to copy version of memory into pointer version of the pointer. After pointer is created, control is transferred back to 290, wherein the command is executed. In 240, pointer copy is performed, which occurs when a pointer is copied to another pointer and has been described previously. After pointer copy is performed, control is transferred back to 290. In 250, a memory allocation is performed, which occurs due to a stack frame creation at the time of a method call, or when heap memory allocation methods such as malloc( ) are called and has been described previously. After performing the memory allocation, control is then transferred to 290. In 260, the allocated memory is freed, which occurs when a method execution is completed and the stack frame for the method is freed, or when methods like free( ) are called for de-allocating heap memory, and control is transferred back to 290.

When a checksum of the pointer version associated with the pointer in the first memory and the version in the version segment for the object referred by the pointer in the first memory is false, or negatively determined, this indicates the existence of a dangling pointer, and when ever such a dangling pointer is detected, the user may be informed in the form of a report.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention. The system depicted in FIG. 1 may be, for example, an IBM eServer pSeries system, a product of International Business Machines Corporation in Armonk, N.Y., running the Advanced Interactive Executive (AIX) operating system or LINUX operating system.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware and software comprising several distinct elements.

What is claimed is:

1. A method for dynamic identification of dangling pointer, the method comprises:
   segmenting a main memory preferably into three parts comprising (i) a first memory configured to store an object, the object is a respective stack and/or a respective heap; (ii) a version segment configured to store a version of a memory location in the first memory, the version initialized to a value zero; (iii) a pointer version segment configured to store a version of the pointer associated with the memory location in the first memory, the pointer version initialized to a negative value; and
   indicating reference to a dangling pointer on negative determination of the pointer version with the version on dereferencing a pointer in the first memory;
   further comprising: allocating a memory segment from the first memory for the object;
   creating a pointer for the object in the first memory segment;
   storing the pointer comprising an address of the object in the first memory segment; and
   assigning the version in the version segment associated with an object in the first memory to the pointer version in the pointer version segment associated with the pointer in the first memory; wherein when a pointer in the first memory is dereferenced comparing the pointer version associated with the pointer in the first memory against the version in the version segment for the object referred by the pointer in the first memory, and concluding that the pointer in the first memory is a dangling pointer when the comparison fails to yield a match.

2. The method of claim 1, wherein after every instance of allocating the memory segment in the first memory a counter associated with the main memory is incremented by a unit value and the value of the counter is stored at a respective location in the version segment.

3. The method of claim 2, wherein the counter is initialized to a value of zero prior to segmentation of the main memory.

4. The method of claim 1, wherein when the pointer for the object in the first memory is copied to another pointer in the first memory, the pointer version associated with the copied pointer is also copied to the pointer version segment.

5. The method of claim 1, wherein upon identification of a dangling pointer generating a report and transmitting the report to an end user.

6. The method of claim 1, further comprises setting the respective version in the version segment to a negative value in response to freeing the object from the first memory.

7. A system comprising at least a processor and a main memory capable of executing software comprising:
   a processor programmed to:
      segment a memory preferably into three parts comprising (i) a first memory configured to store an object, the object is a respective stack and/or a respective heap; (ii) a version segment configured to store a version of a memory location in the first memory, the version initialized to a value zero; (iii) a pointer version segment configured to store a version of the pointer associated with the memory location in the first memory, the pointer version initialized to a negative value; and
      indicate reference to a dangling pointer on negative determination of the pointer version with the version on dereferencing a pointer in the first memory;
   wherein: a memory segment from the first memory is allocated for the object; a pointer is created for the object in the first memory segment and the pointer comprising an address of the object is stored in the first memory segment;
   the version in the version segment associated with an object in the first memory is assigned to the pointer version in the pointer version segment associated with the pointer in the first memory; and wherein on dereferencing a pointer in the first memory the pointer version associated with the pointer in the first memory is checked with the version in the version segment for the object referred by the pointer in the first memory and on negative determination reference to the dangling pointer is indicated.

8. The system of claim 7, wherein after every instance of allocating the memory segment in the first memory a counter associated with the main memory is incremented by a unit value and the value of the counter is stored at a respective location in the version segment.

9. The system of claim 8, wherein the value of the counter being initialized to zero after segmentation of the main memory.

10. The system of claim 7, wherein when the pointer for the object in the first memory is copied to another pointer in the first memory, the pointer version associated with the copied pointer is also coped to the pointer version segment.

11. The system of claim 7, wherein on detection of a dangling pointer, generating a report and transmitting the report to an end user.

12. The system of claim 7, wherein upon freeing the object from the first memory, the respective version in the version segment is set to a negative value.

13. A method of executing software on a system, wherein the software in the form of a readable code is executed on a main memory of the system, the system capable of performing the method of claim 1.

* * * * *